United States Patent [19]

Kersten et al.

[11] Patent Number: 5,139,341
[45] Date of Patent: Aug. 18, 1992

[54] OPTICAL MODULATOR

[75] Inventors: Peter Kersten, Leonberg; Andreas Wieder, Stuttgart; Helmut Hanisch, Nürtingen, all of Fed. Rep. of Germany

[73] Assignee: Alcatel N.V., Amsterdam, Netherlands

[21] Appl. No.: 633,388

[22] Filed: Dec. 31, 1990

[30] Foreign Application Priority Data

Jan. 11, 1990 [DE] Fed. Rep. of Germany ....... 4000616

[51] Int. Cl.$^5$ ................................................ G02F 1/03
[52] U.S. Cl. ..................................... 359/251; 359/254; 264/1.3
[58] Field of Search ............... 359/246, 247, 251, 252, 359/254, 321, 483; 264/1.3

[56] References Cited

U.S. PATENT DOCUMENTS 3,990,770 11/1976 Carl et al. .......................... 359/251
4,691,984 9/1987 Thaniyavarn .................... 350/96.14

FOREIGN PATENT DOCUMENTS 0021967 1/1981 European Pat. Off. .

OTHER PUBLICATIONS

Pantellis, et al. "Organic Polymer Films for Nonlinear Optics", Br Telecom Technol J, vol. 6, No. 3, Jul., 1988.
"Journal of Applied Physics", 64, No. 5, 1 Sep. 88, NY US; Hill et al.: "Demonstration of the . . .".
Spie, vol. 971 Proceedings, "Nonlinear Optical . . .", 1988, pp. 218–229; Lytel et al.: Organic electroptic . . .

Primary Examiner—Frank Gonzalez
Attorney, Agent, or Firm—Spencer, Frank & Schneider

[57] ABSTRACT

An optical modulator having a slit arrangement and an associated zone exhibiting both an electrooptical effect and an intrinsic polarization direction, includes an electrode arrangement to which an information signal is applied during operation. The slit arrangement is a double slit arrangement while the electrode arrangement includes three electrodes between which the slits are disposed. At one slit, the electrical field of the signal is oriented in the same direction as the intrinsic polarization direction and, at the other slit, the electrical field of the signal is oriented in a direction opposite to the intrinsic polarization direction.

13 Claims, 3 Drawing Sheets

OPTICAL MODULATOR

CROSS REFERENCE TO RELATED APPLICATION

This application claims the priority of application Ser. No. P 40 00 616.6, filed Jan. 11, 1990, in the Federal Republic of Germany, the subject matter of which is incorporated herein by reference.

BACKGROUND OF THE INVENTION

This invention relates to an optical modulator including a slit arrangement that is associated with a zone exhibiting an electrooptical effect as well as a preferred polarization direction. The modulator further includes an electrode arrangement to which a signal is applied for modulation operation.

Such an arrangement is disclosed in the article, entitled "Organic Polymer Films For Nonlinear Optics," published in Br. Telecom Technol., Volume 6, 1988. FIGS. 11 and 12 of this publication show an optical modulator which includes a glass substrate on which a polymer is disposed that is equipped with interdigital electrodes. The two electrodes are provided with two meshing "comb arrangements" and are each connected with a signal terminal. For manufacture of such an electrooptical modulator, the polymer is heated and simultaneously a direct voltage potential is applied to the signal terminals. The direct voltage potential remains in effect until the modulator has cooled to room temperature. The result is a polarization of the polymer. If now, during modulation operation, light, particularly laser light, is conducted through the optical grating formed by the electrodes and constituting a slit arrangement, diffraction lines are formed which can be made visible, for example, on a screen disposed behind the optical modulator. If a signal (alternating voltage signal) is applied to the signal terminals, a change in the refraction index of the described grating occurs which influences the arrangement of the diffraction lines. The latter thus change according to the information content of the signal. By means of a detector which scans the diffraction lines, the light modulation can be reconverted into an electrical signal. Since in the prior art arrangement the change in the index of refraction is the same for all individual slits of the grating, light modulation can be observed only in the near field. Therefore, the prior art arrangement has a relatively poor efficiency.

SUMMARY OF THE INVENTION

It is an object of the invention to provide an optical modulator of the above-mentioned type which has high efficiency and thus high effectiveness.

This is accomplished by the present invention in that the slit arrangement is configured as a double slit arrangement including three electrodes between which the slits are located and which are configured in such a way that, at the first slit, the electrical field of the signal is oriented in the same direction as the polarization field and, at the other slit, the electrical field of the signal extends in the opposite direction to the polarization field. Because of the arrangement according to the invention, the signal supports the polarization field generated during the preceding polarization in the one slit of the double slit arrangement, while in the other slit the field of the signal and the polarization value extend in opposite directions. This opposition existing between the two slits has the result that the refractive indices in the two slits are changed in opposite directions so that the optical modulator according to the invention becomes very efficient and thus highly effective. Because of the change in index to the same extent but in the opposite direction in the two individual slits, the modulation can be observed not only in the near field but also in the remote field.

According to a modification of the invention, the zone is intended to be composed of a non-linear optical polymer (NLO polymer).

The zone may preferably be disposed on a substrate.

According to another feature of the invention, its configuration is simplified in that the slit arrangement is formed by electrodes.

The electrodes may be arranged in the region of the interface between substrate and zone. For example, the electrodes may be disposed on the surface of the substrate and may be covered by the zone.

However, as an alternative, it is also possible to have a buffer layer disposed between the electrodes and the zone. This buffer layer prevents high interfering field intensities from occurring at the electrode edges in the zone.

Preferably, the buffer zone may be made of polymethyl methacrylate (PMMA).

If a larger irradiation area is to be created for the laser light, several double slit arrangements can be arranged next to one another with their adjacent slits lying parallel to one another. This results in the formation of a grating.

Also possible is the formation of a cascade for the production of logic linkages. In this case, several (e.g., two) double slit arrangements are arranged in tandem. The light coming from the optical modulator associated with the light source impinges on a further optical modulator and is there processed further, corresponding to the signal actuation.

Finally, in order to form modulator arrays, it is possible to arrange several dual slit arrangements on top of one another with their slits being flush.

BRIEF DESCRIPTION OF THE DRAWINGS

The drawing figures illustrate the invention by showing several embodiments thereof.

DESCRIPTION OF THE PREFERRED EMBODIMENT

Figure 1:
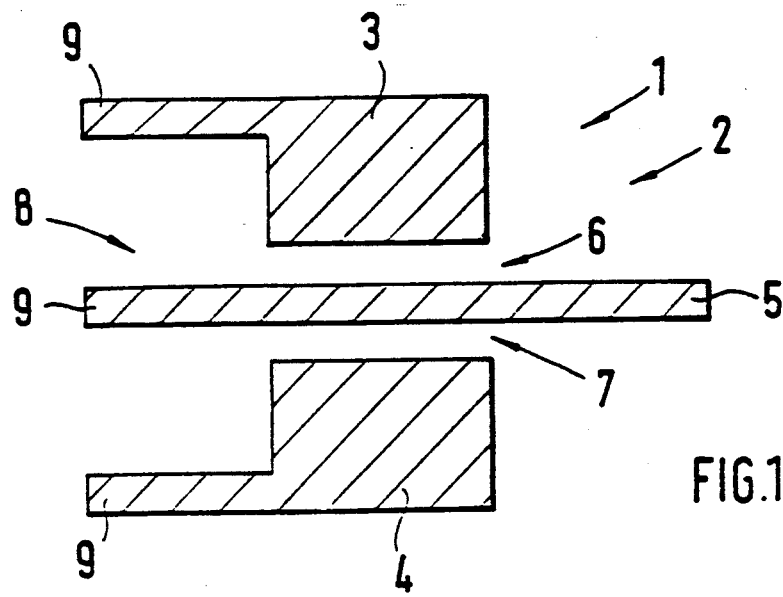
FIG. 1 is a schematic sectional view of the electrode arrangement of an optical modulator.
Figure 2:
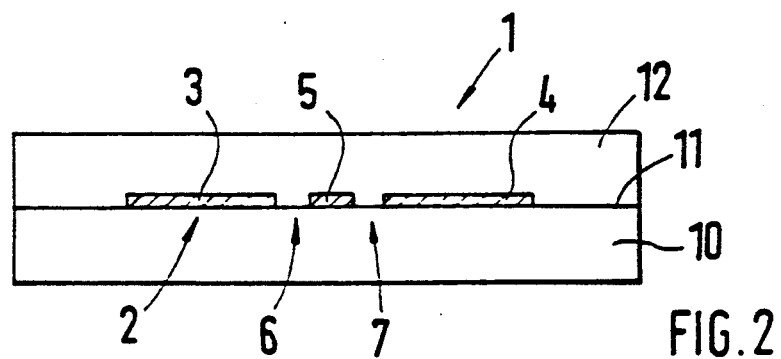
FIG. 2 is a cross-sectional view of a modulator including the electrode arrangement shown in FIG. 1.

According to FIGS. 1 and 2, the optical modulator 1 according to the present invention is composed of an electrode arrangement 2 that includes three electrodes.

A center electrode 5 is arranged between two outer electrodes 3 and 4.

Between outer electrode 3 and center electrode 5, there is formed a first slit 6 and between the outer electrode 4 and center electrode 5, there is formed a second slit 7. Slits 6 and 7 form a double slit arrangement 8. Electrodes 3 and 4 and center electrode 5 are each provided with a signal terminal 9 for the application of a polarization potential or a signal, respectively.

Center electrode 5 has a width of 100 $\mu$m. This dimension corresponds to the spacing between the first slit 6 and the second slit 7. The slit width in each case is 20 $\mu$m. Electrode arrangement 2 is composed of CrAu. It is located on the surface 11 of a substrate 10 and is covered by a zone 12 exhibiting an electrooptical effect as shown in FIG. 2. Zone 12 is composed of a non-linear optical polymer (NLO polymer) which is applied as a coating to substrate 10, preferably by spin coating. The layer thickness is a few microns (in particular, 3.7 $\mu$m).

For the manufacture of the modulator 1 according to the invention, zone 12 is heated, with simultaneously the outer electrodes 3 and 4 being placed at the same potential (e.g., ground). The center electrode 5 is placed at another direct voltage potential (e.g., +600 Volt). This causes the polarization fields of the individual slits 6 and 7 to extend in opposite directions.

During modulation operation, double slit arrangement 8 is irradiated with light, particularly laser light, with the position of the polarization plane of the incident light being significant. If the polarization P of the incident light lies in the plane of the drawing, the electrooptical coefficient $r_{33}$ becomes effective. If the incident light is polarized perpendicularly to the plane of the drawing, the electrooptical coefficient $r_{13}$ is decisive. If NLO polymers are employed as zone 12, the following applies according to previous examinations:

$$r_{33} >> r_{13}$$

Figure 4:
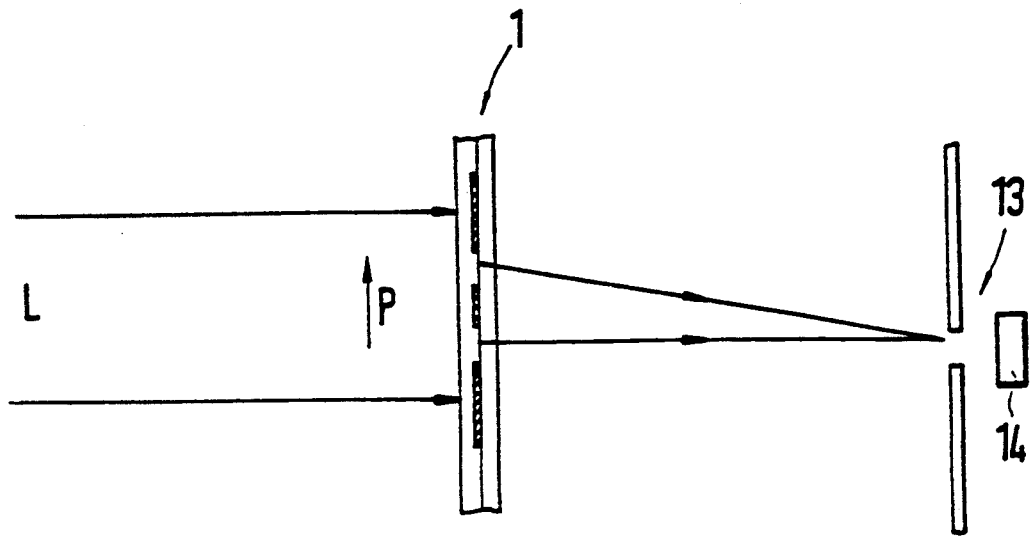
FIG. 4 is a schematic representation of an optical modulator in modulation operation whose modulated light is picked up by a photodetector.

FIG. 4 shows the above-described optical configuration, with the polarization P of the incident light L lying in the plane of the drawing. A single slit 13 is disposed behind optical modulatoer 1 and, behind it, a photodetector 14.

The arrangement—polarized as already described above—is operated with a signal in such a manner that the outer electrodes 3 and 4 are at oppositely equal voltages relative to the center electrode 5 which is connected to ground. Thus, in the one slit (e.g., first slit 6), the electrical field of the signal is oriented in the same direction as the previously applied polarization field while, in the other slit (e.g., second slit 7), the field of the signal is oriented oppositely to the previously applied polarization field. This results in opposite identical changes in the refractive index in both slits 6 and 7. Application of a signal to electrodes 3 to 5 of the double slit arrangement 8 causes the diffraction image to be shifted so that photodetector 14 which is disposed behind single slit 13 is able to detect a fluctuation in intensity. Photodetector 14 is not part of modulator 1 but serves only to detect the modulation.

Based on the arrangement according to the invention, it is possible, in principle, to realize very high intensity fluctuations which are the result of particularly high degrees of modulation.

As an alternative to the already described polarization and signal application, the procedure may also be such that the two individual slits (first slit 6 and second slit 7) have polarization fields that extend in the same direction. For this purpose, the direct polarization voltage is applied accordingly to electrodes 3 to 5. For actuation by the signal, the center electrode is then connected, for example, to ground, while the two outer electrodes 3 and 4 are charged with the same signal potential.

Figure 3:
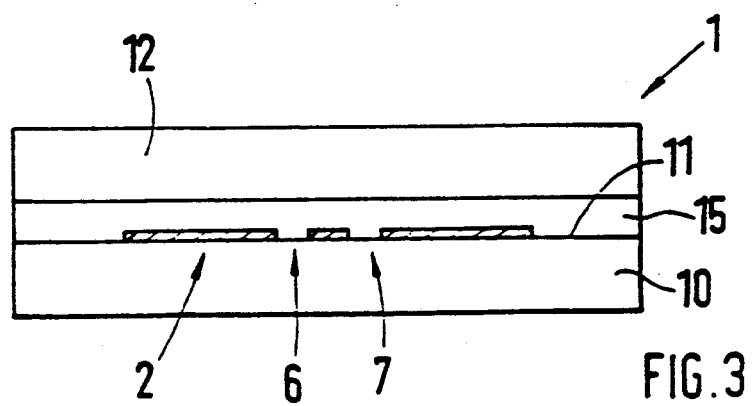
FIG. 3 is a cross-sectional view of a further embodiment of an optical modulator provided with a buffer layer.

In contrast to the embodiment of FIG. 2, in the embodiment of FIG. 3, modulator 1 is provided with a buffer layer 15. The electrode arrangement 2 resting on the surface 11 of substrate 10 is embedded in buffer layer 15. It is composed of polymethyl methacrylate (PMMA). Its layer thickness is preferably 1.5 $\mu$m. Then zone 12 composed of an NLO polymer is applied to buffer layer 15. Extremely high field intensities which may appear at the edges of the electrodes are prevented in zone 12 by buffer zone 15 so that these extreme field intensities will not have an interfering effect.

Figure 5:
FIG. 5 is the signal curve for a relative change in intensity.

FIG. 5 shows the relative light intensity change $\Delta I$ according to the embodiment of FIG. 3. It is:

$$\frac{\Delta I}{I} = 2.4 \cdot 10^{-3}$$

where the individual slit width is 20 $\mu$m, the layer thickness of zone 12 is 3.7 $\mu$m (NLO polymer) the layer thickness of PMMA buffer layer 15 is 1.5 $\mu$m, the spacing between slits is 100 $\mu$m, the voltage is $\pm 100$ Volt and $r_{33} = 8.3$ pm/V.

Figure 6:
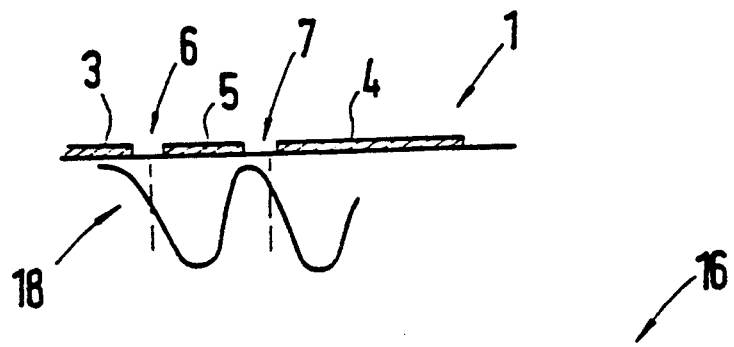
FIG. 6 is a cascade formed of two double slit arrangements in tandem.
Figure 6:
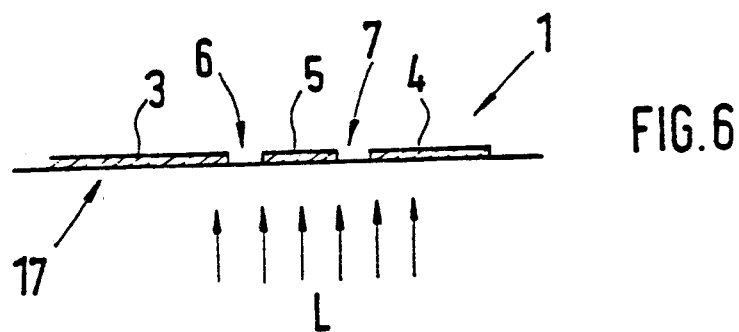
Figure 7:
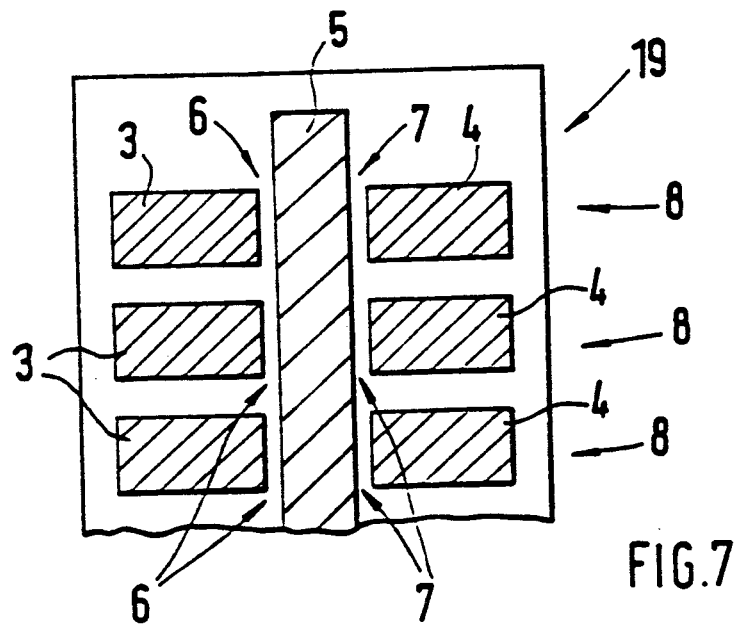
FIG. 7 is a modulator array.

FIG. 6 shows a cascade 16 which is formed by two modulators 1 placed one behind the other. In this way it is possible to realize, for example, logic linkages. The arrangement is such that the first double slit arrangement 17 facing the incident light is offset in such a way relative to the second double slit arrangement 18 behind it that the slits of the second double slit arrangement lie at the height of the edges of the intensity maxima of the Fraunhofer lines formed by the first double slit arrangement 17. This is shown in FIG. 6.

Modulator 1 may also be configured as a modulator array 19, in which case several double slit arrangements 8 have a common center electrode 5 and are arranged one above the other with their slits 6 and 7, respectively being flush with one another. Cascades 16 can also be formed from such modulator arrays 19.

It will be understood that the above description of the present invention is susceptible to various modifications, changes and adaptations, and the same are intended to be comprehended within the meaning and range of equivalents of the appended claims.

What is claimed is:

1. An optical modulator comprising:
    a material which exhibits both an electro-optical effect and an intrinsic polarization direction; and
    an electrode arrangement, disposed adjacent to said material, to which a signal is applied to produce electrical fields in the material for controlling modulation operation, electrodes of said electrode arrangement forming at least one slit arrangement;
    wherein the at least one slit arrangement comprises a double slit arrangement including first and second slits, and the electrode arrangement comprises three electrodes, a center electrode disposed between two outer electrodes, the first and second slits each being disposed between the center electrode and one of the two outer electrodes, respectively, and configured so that at the first slit, the electrical field in the material produced due to the signal is oriented in the same direction as the intrinsic polarization direction of the material and, at the second slit, the electrical field in the material produced due to the signal is oriented in a direction opposite to the intrinsic polarization direction of the material;

whereby refractive indices in the material at the two slits are changed to the same extent but in opposite directions during modulation.

2. A modulator according to claim 1, wherein the material is composed of a non-linear optical polymer (NLO polymer).

3. A modulator according to claim 1, wherein the intrinsic polarization direction is established in the material during manufacture by means of the electrode arrangement.

4. A modulator according to claim 1, wherein the material is disposed on a substrate and the electrodes are disposed at a region of interface between the substrate and the material.

5. A modulator according to claim 1, wherein a buffer layer is disposed between the electrodes and the material.

6. A modulator according to claim 5, wherein the buffer layer is composed of polymethyl methacrylate (PMMA).

7. A modulator according to claim 1, wherein said electrode arrangement forms a plurality of double slit arrangements having mutually parallel adjacent slits arranged next to one another.

8. A modulator according to claim 1, wherein, in order to form a cascade for logic linkages, a plurality of double slit arrangements are provided arranged one behind the other.

9. A modulator according to claim 1, wherein, in order to form modulator arrays, a plurality of double slit arrangements are provided arranged one above the other with their slits flush with one another.

10. An optical modulator according to claim 1, the optical modulator having a particular intrinsic polarization, the modulator having at least one electrode arrangement forming at least one double slit arrangement which includes two slits and is associated with a material exhibiting electrooptical and polarization effects, the at least one electrode arrangement including three electrodes, a center electrode and two outer electrodes, the two slits each being disposed between the center electrode and one of the two outer electrodes respectively, manufactured by the method comprising the steps of:

providing the material, electrode arrangement, and slit arrangement;

heating the material; and simultaneously with heating the material, placing the outer electrodes at the same dc electrical potential and placing the center electrode at a different dc electrical potential from that of the outer electrodes;

whereby polarization fields of the material at the respective slits are caused to extend in opposite directions.

11. An optical modulator according to claim 1, the optical modulator having a particular intrinsic polarization, the modulator having at least one electrode arrangement forming at least one double slit arrangement which includes two slits and is associated with a material exhibiting electrooptical and polarization effects, the at least one electrode arrangement including three electrodes, a center electrode and two outer electrodes, the two slits each being disposed between the center electrode and one of the two outer electrodes respectively, manufactured by the method comprising the steps of:

providing the material, electrode arrangement, and slit arrangement;

heating the material; and simultaneously with heating the material, placing one of the outer electrodes at the same dc electrical potential as the center electrode and placing the other outer electrode at a different dc electrical potential from that of the center electrode;

whereby polarization fields of the material at the respective slits are caused to extend in the same direction.

12. A method of manufacturing an optical modulator to have a particular intrinsic polarization, the modulator having a double slit arrangement which includes two slits and is associated with a material exhibiting electrooptical and polarization effects, the modulator including three electrodes, a center electrode and two outer electrodes, the two slits each being disposed between the center electrode and one of the two outer electrodes respectively, comprising the steps of:

providing the material, the slits and the three electrodes;

heating the material; and simultaneously with heating the material, placing the outer electrodes at the same dc electrical potential and placing the center electrode at a different dc electrical potential from that of the outer electrodes;

whereby polarization fields of the material at the respective slits are caused to extend in opposite directions.

13. A method of manufacturing an optical modulator to have a double slit arrangement which includes two slits and is associated with a material exhibiting electrooptical and polarization effects, the modulator including three electrodes, a center electrode and two outer electrodes, the two slits each being disposed between the center electrode and one of the two outer electrodes respectively, comprising the steps of:

providing the material, the slits and the three electrodes;

heating the material; and simultaneously with heating the material, placing one of the outer electrodes at the same dc electrical potential as the center electrode and placing the other outer electrode at a different dc electrical potential from that of the center electrode;

whereby polarization fields of the material at the respective slits are cause to extend in the same direction.

* * * * *